Jan. 13, 1959 D. J. KLEIN 2,868,471

TAPE RECORDER

Filed Jan. 23, 1957 2 Sheets-Sheet 1

INVENTOR.

Dietrich J. Klein,

By Schroeder, Hofgren, Brady & Wegner Atty's.

INVENTOR.
Dietrich J. Klein,
BY Schroeder, Hofgren,
Brady & Wegner
Atty's.

2,868,471

TAPE RECORDER

Dietrich J. Klein, Chicago, Ill., assignor, by mesne assignments, to Warwick Manufacturing Corporation, Chicago, Ill., a corporation of Delaware Application January 23, 1957, Serial No. 635,633

12 Claims. (Cl. 242—55.12)

This invention relates to a tape recorder and more particularly to improved brake and drive mechanism therefor.

An object of this invention is to provide a new and improved tape recorder.

Another object of the invention is to provide a tape recorder having a pair of tape reel supporting spindles, a brake member associated with the spindles and mechanism for positively operating the brake member operable independently from either of two control members for the spindle drive means.

A further object of the invention is to provide a tape recorder as defined in the preceding paragraph in which one of the control members is a record control shaft and the other member is a fast wind-rewind control shaft, each of which is operatively connected to a motion transmitting connector, said connector being connected to the brake member whereby rotation of either of said shafts will result in shifting the brake member.

Another object of the invention is to provide a tape recorder having a pair of movably mounted reel supporting spindles, drive means for the spindles, including a drive belt and pulley members whereby each of the spindles has a drive position, with the belt relatively taut and a non-driving position wherein the belt is less taut, a record control shaft operatively connected to one of the spindles to engage the drive therefor and a fast wind-rewind control shaft rotatable in opposite directions and operatively connected to move one spindle to a drive position when rotated in one direction and to move the other spindle to a drive position when rotated in the opposite direction, a brake plate movable in a direction generally transversely to a line between the spindles and having brake surfaces positioned adjacent the spindles, a bell crank having a first arm connected to the brake plate, and another arm terminating adjacent the fast wind-rewind control shaft, a spring connected to the bell crank for urging the brake plate to a braking position in engagement with the spindles, a cam plate attached to the fast wind-rewind control shaft and operable when said shaft is rotated to engage and shift the bell crank to move the brake member to a non-braking position, a link connected for movement with the record control shaft and having an end slidable in an opening in the other bell crank arm and a shoulder on the link operable when the record control shaft is rotated to engage and shift the bell crank against its spring and move the brake plate to a non-braking position.

The objects of the invention generally set forth, together with other ancillary advantages, are attained by the construction and arrangement shown by way of illustration in the accompanying drawings, in which.

Figure 1:
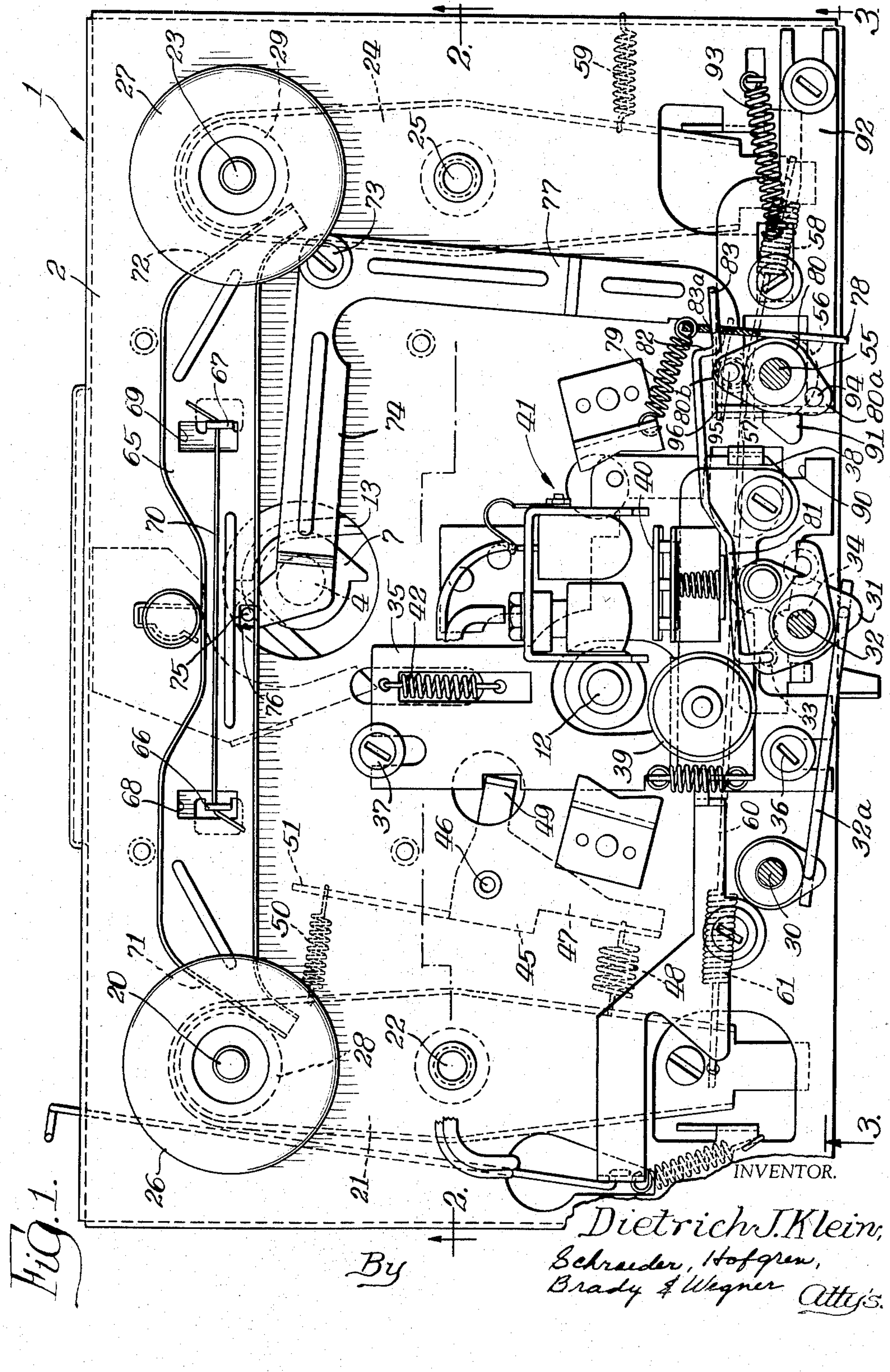
Fig. 1 is a plan view of the tape recorder with the cover plate removed and parts broken away.

While this invention is susceptible of embodiment in many different forms, there is shown in the drawings and will herein be described in detail an illustrative embodiment of the invention with the understanding that the present disclosure is to be considered as an exemplification of the principles of the invention and is not intended to limit the invention to the embodiment illustrated. The scope of the invention will be pointed out in the appended claims.

Figure 2:
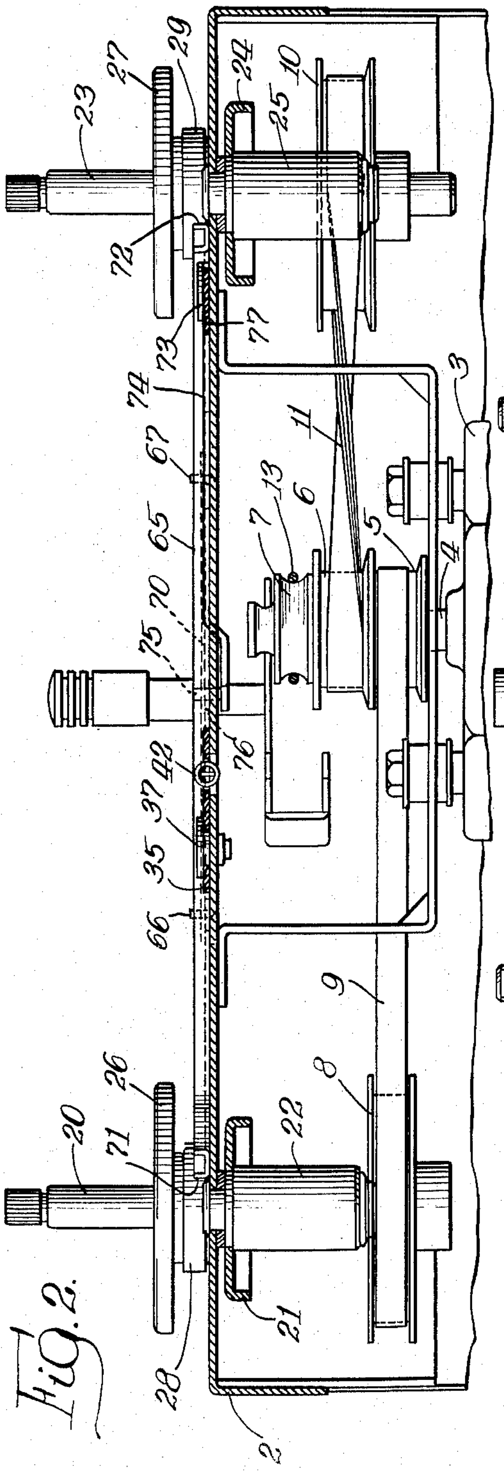
Fig. 2 is a vertical section taken generally along the line 2—2 in Fig. 1.
Figure 3:
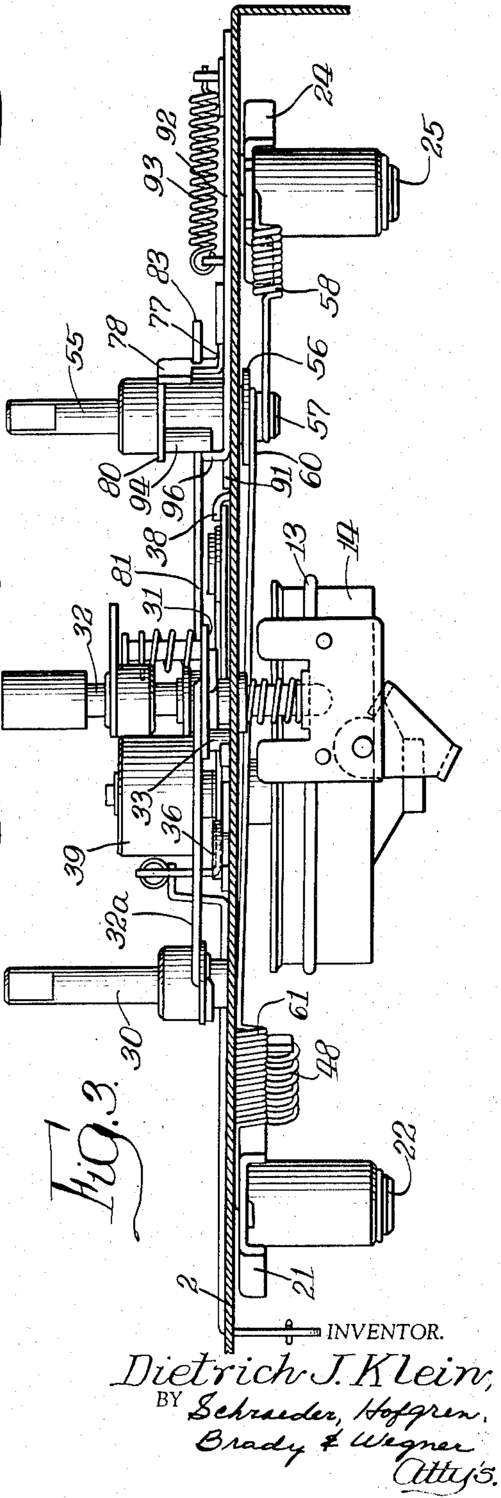
Fig. 3 is a vertical section taken generally along the line 3—3 in Fig. 1.

A tape recorder indicated generally at 1 has a base plate 2 from which a motor 3 is suspended. The motor 3 drives a pulley shaft 4 which carries drive pulleys 5, 6 and 7 (Fig. 2). The drive pulley 5 is connected to a driven pulley 8 by a belt 9 and the drive pulley 6 is connected to a driven pulley 10 by a belt 11. The belts 9 and 11 may be of a woven rayon material. The drive pulley 7 is connected to a tape drive capstan 12 by a belt 13 and a fly-wheel 14 associated with the capstan 12.

The driven pulley 8 is mounted on a tape reel supporting spindle 20, rotatably mounted in an arm 21 which is pivotally mounted to the base 1 on its under side by a pin 22. The driven pulley 10 is connected to a tape reel supporting spindle 23 rotatably mounted in an arm 24 which is pivotally mounted to the base on its under side by a pin 25. Each of the spindles 20 and 23 is adapted to carry a reel holder as shown at 26 and 27, respectively, and a friction collar 28, 29 is formed on each reel holder.

With the motor 3 in operation the driving of either of the spindles 20 or 23 is determined by the distance between the driving and driven pulleys associated therewith. With a maximum distance between pulleys a drive belt is sufficiently taut to drive a spindle. With a decreased distance between pulleys a drive belt is less taut and the associated spindle is not driven.

A first control element comprises a record control shaft 30 which is connected to a rotatable member 31 on shaft 32 by a link 32*a*. The member 31 has a pin 33 which coacts with a cam surface including notch 34 for shifting an L-shaped plate 35. The L-shaped plate 35 is mounted for sliding movement on the base plate 1 by slot and pin connections 36 and 37 and a guiding flange 38. The plate 35 carries an idler wheel 39 and a backing member 40 which coact with the drive capstan 12 and magnetic head structure indicated generally at 41. As shown in Fig. 1, the mounting plate 35 is located in a forward position and held there by a spring 42 with the idler wheel 39 and backing member 40 spaced from the capstan 12 and head structure 41. When the record control shaft 30 is rotated, the pin 33 functions to shift the mounting plate 35 rearwardly against spring 42 to engage the idler wheel 39 with the capstan 12 and the backing member 40 with the head structure 41.

A bell crank 45 is pivotally mounted on the base plate 1 by a pin 46 and has an arm 47 connected to the spindle supporting arm 21 by a spring 48. Another arm 49 of the bell crank 45 engages a notch in the mounting plate 35 so that rearward movement of the mounting plate results in pivoting the bell crank so as to shift the spindle mounting arm 21 in a direction to increase the distance between the spindle 20 and the pulley shaft 4. This makes the belt 9 sufficiently taut so as to drive the spindle 20 in a clockwise direction as viewed in Fig. 1. When the mounting plate 35 is in its forward position, the spindle 20 is in the non-driving position with the drive belt 9 less taut, and is yieldably maintained in this position by a spring 50 connected between the arm 21 and an extension 51 of the bell crank 45.

A second control element comprises a fast wind-rewind control shaft 55 rotatably mounted in the base plate 1 and which carries a plate 56 beneath the base 1, having a lug 57 mounted eccentrically of the control shaft 55 to which a spring 58 having a U-shaped end is slidably connected. The spring 58 at its other end is attached to the spindle mounting arm 24 so that as the control shaft 55 rotates in a counterclockwise direction in a fast rewind operation as viewed in Fig. 1, the spindle mounting arm 24 is rotated in a clockwise direction to place the spindle 23 in a driving position wherein the driving belt 11 is taut and the spindle 23 rotates counterclockwise. The return of the control shaft 55 to a neutral position results in the spindle 23 moving to a non-driving position under the urging of a spring 59 wherein the belt 11 is less taut.

The lug 57 associated with the control shaft 55 has an elongated U-shaped end 60 of a spring 61 slidably attached thereto and the opposite end of the spring is connected to the spindle mounting arm 21. Rotation of the control shaft 55 in a clockwise direction will move the spindle 20 to a drive position in a fast wind operation. The spindle 20 is rotated in a clockwise position in both record and fast wind operations; however, in a record operation, the idler wheel 39 engages a tape with the drive capstan 12, which results in the movement of the tape at a slower rate than in a fast wind operation.

A brake member is provided for the tape drive spindles 20 and 23 and comprises an elongated brake plate 65 movably mounted on the base plate 1 by ears 66 and 67 struck up from the base plate and extending through enlarged openings 68 and 69 respectively in the brake plate. An elongated wire 70 extends through openings in the ears 66 and 67 to confine the brake plate on the base plate. The opposite ends of the brake plate are provided with brake surfaces which are angled relative to the path of travel of the brake plate. An elongated brake surface 71 is associated with the friction collar 28 on the spindle 20 and an elongated brake surface 72 is associated with the friction collar 29 on the spindle 23. An actuator for the brake member comprises a motion transmitting connector in the form of a bell crank pivotally mounted on the base 1 by a pin 73 and having an arm 74 provided with a pin 75 mounted in an opening 76 in the brake plate. Another arm 77 of the bell crank terminates in an upturned flange or plate 78 lying adjacent the fast wind-rewind control shaft 55. A spring 79 is connected between the base plate 1 and the bell crank arm 77 to normally urge the brake plate into a braking position. The control shaft 55 has a cam plate 80 at the level of the flange 78 so that rotation of the control shaft in either direction will result in either an end **80*a* or 80*b* of the cam engaging the bell crank flange 78 so as to release the brake plate from the spindle collars. The rotatably mounted member 31 associated with the record control shaft 30 has a link 81 connected thereto with a shoulder 82 formed adjacent an end 83 which is slidable in an opening 83*a* in the bell crank flange 78. The rotation of the control shaft 30 to place the recorder in a record operation will result in completing the drive to the spindle 20 and engaging the shoulder 82 of link 81 with the bell crank flange 78 to shift the bell crank and release the brake plate 65. The sliding connection of the link end 83 with the bell crank flange 78 permits independent shifting of the bell crank by the fast wind-rewind control shaft 55**.

In operation, a tape reel supporting spindle 20 or 23 is placed in driving position by outward movement of the spindle to place the driving belt therefor in taut relation which also moves the spindle away from the brake plate. The brake plate is then moved forwardly to free the other spindle which is supporting the supply reel and this operation avoids any tangling of the tape.

In order to prevent operation of one control shaft when the other is in operative position, the L-shaped mounting plate 35 is provided with a notch 90 which coacts with a detent 91 formed on a plate 92 operatively mounted on base plate 1 and normally urged to the right, as viewed in Fig. 1, by a spring 93. The detent 91 may be shifted toward the left against the action of the spring 93 by either of pins 94 and 95, depending from the cam plate 80 which engage against an upturned flange 96 formed at the left-hand end of the plate 92. When the tape recorder is in record operation, the notch 90 is shifted out of alignment with the detent 91 so as to block the detent and prevent rotation of the control shaft 55. Alternately, with the control shaft 55 shifted for either a fast wind operation or a rewind operation, the detent 91 is in notch 90 so as to prevent operation of the record control shaft 30.

I claim:

1. A tape recorder comprising, a base, a pair of arms pivotally mounted on the base and each having a reel supporting spindle, a friction collar on each spindle, drive means for the spindles including a drive pulley, a belt and a driven pulley associated with each spindle whereby each of the spindles has a drive position in which the belt associated therewith is sufficiently taut to drive the spindle and has a non-driving position wherein the belt is less taut, a record control shaft operatively connected to move one of said arms to engage the drive for the spindle carried thereon, a fast wind-rewind control shaft rotatable in opposite directions and operatively connected to move said one arm to a drive position in a fast wind operation and operatively connected to move said other arm to a drive position in a rewind operation, a brake plate movably mounted on the base for movement in a direction generally transverse to a line between the spindles and having ends positioned adjacent the spindle friction collars, a bell crank pivoted on the base and having a first arm connected to the brake plate and another arm terminating adjacent the fast wind-rewind control shaft, a spring connected to the bell crank for urging the brake plate to a braking position in engagement with said spindles, a cam plate attached to the fast wind-rewind control shaft and operable when the control shaft is rotated to engage and shift the bell crank to move the brake plate to a non-braking position, a link connected for movement with the record control shaft and having an end slidable in an opening in said other bell crank arm, and a shoulder on the link operable when the record control shaft is rotated to engage and shift the bell crank against the spring and move the brake plate to a non-braking position.

2. In a tape recorder, in combination, a base, a pair of spindle carriers pivotally mounted on the base and each having a reel supporting spindle, drive means for the spindles including a drive pulley, a belt and a driven pulley associated with each spindle whereby each of the spindles has a drive position in which the belt associated therewith is sufficiently taut to drive the spindle and has a non-driving position wherein the belt is less taut, a record control element operatively connected to move one of said carriers to engage the drive for the spindle carried thereon, a rewind control element carrier operatively connected to move said other carrier to a drive position in a rewind operation, a brake member movably mounted on the base and having parts positioned adjacent the spindles, a motion-transmitting connector pivoted on the base connected to the brake member and terminating adjacent the rewind control element, a cam attached to the rewind control element and operable when the control element is moved to engage and shift the belt connnected to move the brake member to a non-braking position, a link connected for movement with the record control element and having an end slidable in an opening in said connector, and a shoulder on the link operable when the record control element is moved to engage and shift the connector and move the brake member to a non-braking position.

3. A tape recorder having, in combination, a base plate, a pair of spaced apart reel spindles each having a friction collar thereon disposed above the base plate, a drive mechanism for said spindles, a first manually rotatable control shaft for said drive mechanism having a neutral position and a drive position to effect a drive to a spindle, a second manually rotatable control shaft for said drive mechanism having a neutral position and a drive position to effect a drive to a spindle, a brake plate movably mounted on the base plate and disposed between the spindles with a brake surface at each end thereof adjacent a friction collar and extending at an angle to the direction of movement of the brake plate, a bell crank pivoted on the base plate having an end pivotally connected to the brake plate intermediate its ends and another end positioned adjacent one of said control shafts, a spring connected to the bell crank for normally urging the brake plate into engaging position with said collars, means on said one control shaft engageable with said other end of the bell crank when said control shaft is rotated to a drive position to pivot the bell crank against the spring and release said brake plate from the friction collars, means associated with the other control shaft including a rod slidable in an opening in said other end of the bell crank and having a shoulder engageable with said bell crank when the other control shaft is rotated to a drive position to pivot the bell crank against the spring and release the brake plate from the friction collars.

4. In a tape recorder, in combination, a base, a pair of spaced apart rotatable spindles mounted on said base, drive means for rotating one or the other of the spindles, a brake plate movably mounted on the base and having ends adjacent the spindles, first and second movable control shafts for the drive means and the brake plate, a motion transmitting connector pivotally mounted on the base connected to the brake plate to move said plate between braking and non-braking positions and having an upturned plate thereon with an opening therein adjacent the first control shaft, a spring connected to the connector for urging the brake plate to a braking position, a cam plate attached to the first control shaft and operable when the control shaft is moved to engage and shift the connector against the action of said spring to move the brake plate to a non-braking position, a link connected for movement with the second control shaft and having an end slidable in the plate opening, and an abutment on the link engageable with the upturned plate to shift the connector against the spring and move the brake plate to a non-braking position when the second control shaft is rotated.

5. In a tape recorder, in combination, a base, a pair of spaced-apart rotatable spindles mounted on said base, a brake member movably mounted on the base, first and second rotatable control shafts for controlling the drive of the spindles and the brake member, a bell crank pivotally mounted on the base and having an arm connected to the brake member to move said member between braking and non-braking positions, relative to the spindles, another arm of the bell crank having an upturned plate thereon with an opening thereon adjacent the first control shaft, means for urging the brake member to a braking position, a cam plate attached to the first control shaft and operable when the latter control shaft is rotated to engage and shift the bell crank to move the brake member to a non-braking position, a link connected for movement with the second control shaft and having an end slidable in the bell crank arm opening, a shoulder on the link engageable with the upturned plate to shift the bell crank and move the brake member to a non-braking position when the second control shaft is rotated.

6. A tape recorder mechanism comprising, a base, a pair of spaced apart reel supporting spindles, first and second control members for controlling the driving of the spindles, a brake plate mounted on the base for movement in a direction generally transverse to a line between the spindles, a bell crank pivotally mounted on the base with an arm thereof connected to the brake plate with another arm of the bell crank terminating adjacent the first control member, a spring connected to the bell crank urging the bell crank in a direction to move the brake plate to a braking position in engagement with the spindles, a projection carried on said first control member engageable with said other arm to move the bell crank and the brake plate to a non-braking position as the control member is moved, and a link operable by the second control member and slidable in a slot in said other arm and having a shoulder engageable with the other arm to move the bell crank and the brake plate to a non-braking position when the second control member is moved.

7. In a tape recorder, in combination, a pair of spaced apart spindles each adapted to carry a coil of tape, means for driving one or the other of said spindles, a brake plate disposed between the spindles and having ends selectively engageable with the spindles for braking thereof, means mounting the brake plate for movement relative to the spindles, means for yieldably urging the brake plate to a braking position, a member connected to the brake plate for moving said brake plate between braking and non-braking positions, a pair of independently operable control members for controlling the driving means for the spindles, and means connecting each of said control members to said member independently of the other for causing movement of said member in response to movement of a control member without moving the other control member.

8. A tape recorder as defined in claim 7, including means for preventing movement of one control member when the other control member has shifted the brake plate to non-braking position.

9. In a tape recorder, in combination, a pair of spaced apart rotatable spindles each adapted to carry a tape reel, means for rotating one or the other of said spindles including a drive belt associated with each spindle, means mounting each of the spindles for movement between a drive position in which the associated drive belt is sufficiently taut to drive the spindle and a second non-driving position wherein the belt is less taut, selectively operable means for braking said spindles including a movable brake member having parts thereof selectively engageable with the spindles, a first control member operatively connected to said brake member and to the mounting means for one of said spindles to move said one spindle to a drive position, and subsequently release the brake member, and a second control member operatively connected to said brake member and the mounting means for the other spindle to move said other spindle to a drive position and subsequently release the brake member.

10. In a tape recorder as defined in claim 9, means mounting one of the control members for reciprocable movement, and wherein said one control member is operatively connected to the mounting means for both spindles to move one or the other of said spindles to a drive position depending upon the direction in which it is moved, and also release the brake member.

11. A tape recorder comprising, a pair of spaced apart rotatable spindles each adapted to carry a coil of tape, means for rotating one or the other of said spindles including a drive pulley, a belt and a driven pulley associated with each spindle, means mounting said pulleys for relative movement between a drive position in which the associated belt is sufficiently taut to drive the spindle and a second non-driving position wherein the belt is less taut, selectively operable means for braking said spindles including a movable brake plate having sections thereof selectively engageable with the spindles and an actuator for moving the brake plate, a first control member for shifting one of said pulleys to a drive position to rotate a reel and for shifting said actuator to move the brake plate to a non-braking position out of engagement with the spindles, and a second control member for shifting another of said pulleys to a drive position to rotate a reel and for shifting said actuator independently of the first control member to move the brake plate to said non-braking position.

12. A tape recorder comprising, a pair of spaced apart rotatable spindles each adapted to carry a tape reel, means for rotating one of said spindles including a drive pulley, a belt and a driven pulley, means mounting said one spindle for movement between a drive position in which the associated belt is sufficiently taut to drive the spindle and a second non-driving position wherein the belt is less taut, selectively operable means for braking said spindles including a movable brake member having sections thereof selectively engageable with the spindles, and means for shifting said one spindle to a drive position to rotate a reel thereon and for subsequently moving the brake member to a non-braking position.

References Cited in the file of this patent

UNITED STATES PATENTS

| | | |
|---|---|---|
| 2,408,320 | Kuhlik | Sept. 24, 1946 |
| 2,686,637 | Dashiell | Aug. 17, 1954 |